Patented Dec. 17, 1935

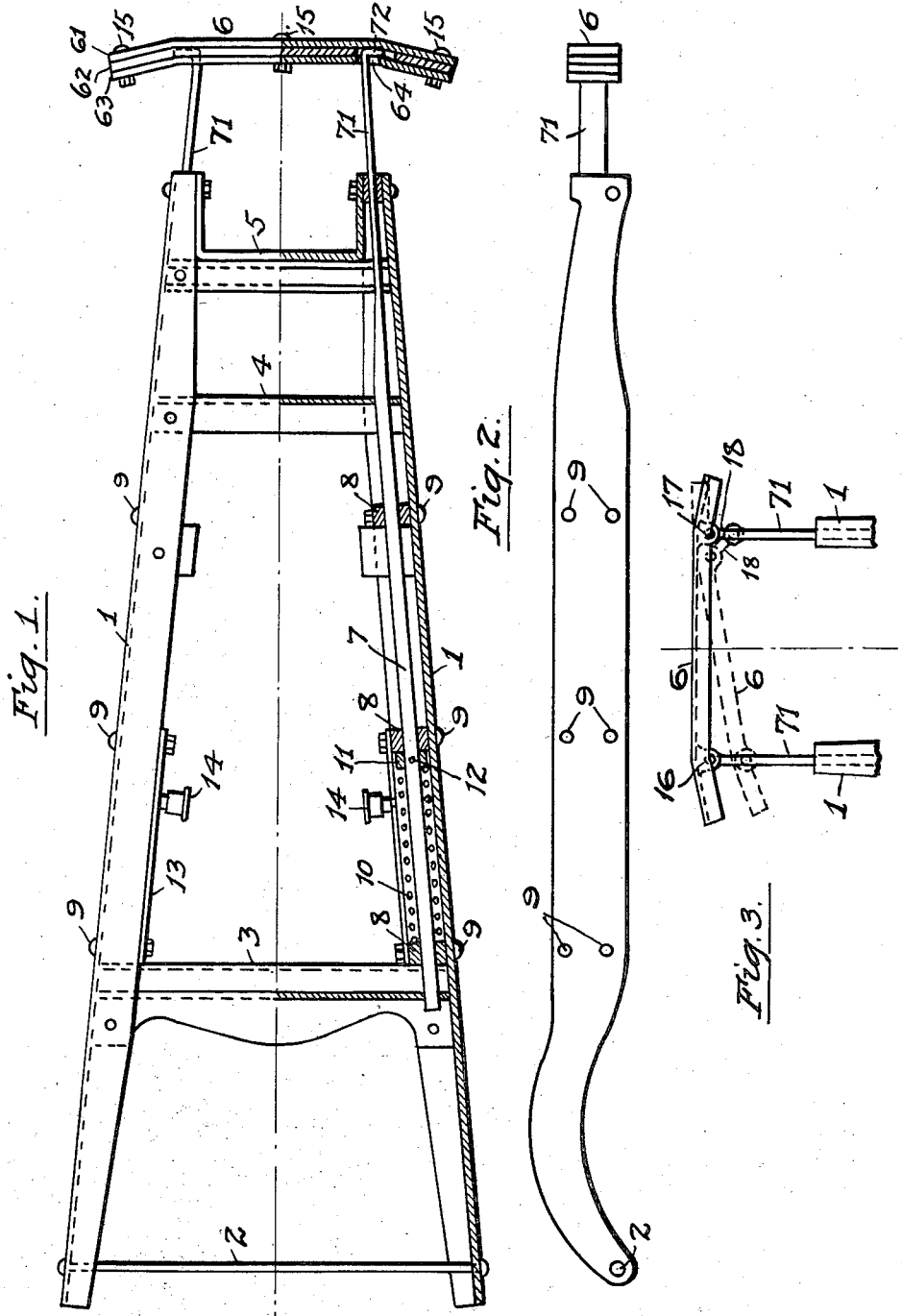

2,024,636

UNITED STATES PATENT OFFICE 2,024,636

SAFETY BUMPER FOR AUTOMOBILES

Joseph Gallina, Detroit, Mich.

Application November 10, 1933, Serial No. 697,389

2 Claims. (Cl. 293—55)

My invention relates to safety bumpers for automobiles, trucks, and other vehicles, and its principal object is to provide a bumper which is more efficient and productive of greater safety in the operation of the vehicle than is possible with bumpers of the type at present employed.

Bumpers of the common form consist in general of a series of flat spring members arranged in various shapes and secured rigidly to the front end of the chassis frame. Such bumpers have a total movement of only a few inches so that they are capable of absorbing impact stresses of relatively small magnitude only. According to my present invention I have provided a bumper equipped with shock-absorbing means having a very large range of movement, whereby the shocks resulting from the impact between the vehicle and an obstruction, or between two vehicles, may be absorbed with much less damage to the vehicle and its occupants than is possible with the present types.

With the above object in view, the invention consists in the improved construction, arrangement, and combination of parts which will be hereinafter fully described, reference being had to the accompanying drawing, which illustrates a preferred embodiment thereof, in which drawing—

Figure 1 is a plan view of a chassis frame equipped with my improved bumper, the lower half being in section.

Figure 2 is a side elevation of the same, and

Figure 3 illustrates a modification.

Like characters designate corresponding parts throughout the several views.

1 designates the longitudinal members of the chassis frame, having the usual channel-shaped transverse section and connected together at intervals by the cross members 2, 3, 4, and 5. 6 is the bumper, which in its normal or uncompressed position is located at a considerable distance from the front end of the frame. 7 is a plunger, which is of circular cross section at its rear end and at its front end is flattened to a rectangular cross section, as indicated at 71. The rear portion of the plunger is slidably supported in guide blocks 8 secured within the channel-shaped frame by means of bolts 9. Adjacent the rear end of the plunger and surrounding the same is the helical compression spring 10, the forward end of which presses against a collar 11 secured by a pin 12 to the plunger, while its rear end re-acts against the adjacent guide block 8.

As will be understood, the spring arrangement above described is provided within both of the chassis frame members 1, and upon the inner face of said members are cover plates 13 secured in position by the bolts 9 and provided with suitable packing so as to form, in conjunction with the main channel and the adjacent guide blocks 8, an enclosed space for the reception of grease whereby the spring and other movable parts are efficiently lubricated, the said grease being introduced by means of any ordinary form of grease cup such as indicated at 14.

The forward ends 71 of the plungers terminate in outwardly bent hook members 72 by which they are connected to the bumper 6. Due to the fact that the respective plungers 7 are not parallel one to the other, it is necessary to provide a sliding connection between one or more of the members 71 and the bumper. For this purpose, in the example shown, the bumper is formed of three flat plates 61, 62, 63, secured together by bolts 15, the member 63 being slotted at 64 for the reception of the member 71, and the member 62 being cut away to provide clearance for the latter.

It will be understood from the foregoing description and by reference to the drawing that I have provided a type of bumper which may be so designed as to be capable of absorbing impact shocks of very great magnitude, and while I have herein described and shown a preferred embodiment of my invention, it will be readily understood by those skilled in the art that the same may be modified in various ways to meet any particular or peculiar requirement without departing from the spirit of my invention. For example, in some cases, such as when employed in heavy trucks, the plungers may be arranged in parallel relation, in which case the guide members, instead of being located within the main channel frame, may be supported by suitable auxiliary cross members. Further, I may employ, in conjunction with the springs above described, any form of hydraulic or hydropneumatic shock-absorbing cylinders or other means in order to obtain greater smoothness of action of the bumper.

Having thus described my said invention, what I claim and desire to secure by Letters Patent of the United States is:

1. In a bumper for vehicles, the combination with a chassis frame of a transverse impact receiving member formed of front, rear, and intermediate plates rigidly connected together, the rear plate having a pair of spaced openings formed therein and the intermediate plate being formed with openings forming pockets having portions registering with openings of the rear plate, and a pair of bars extending longitudinally of said frame and having their front ends passing through the openings of the rear plate and bent transversely to form hooks slidably received in the pockets of the intermediate plate and bearing against inner faces of the front and rear plates.

2. In a structure of the character described, a chassis including side rails, cross bars connecting the side rails, front and rear bearings mounted upon each side rail with the rear bearing abutting a cross bar, a bumper in front of the chassis extending transversely thereof, bars extending longitudinally of the side rails and slidably engaged through the bearings with their front ends projecting from the side rails and secured to the bumper, a collar secured about each bar between the rear bearing and a bearing spaced forwardly therefrom, and a spring about each bar between the rear bearing and the collar and yieldably holding the bar projected forwardly with the collar abutting the forward bearing.

JOSEPH GALLINA.